United States Patent

Mizuno

(10) Patent No.: US 7,139,871 B2
(45) Date of Patent: Nov. 21, 2006

(54) METHOD OF MANAGING STORAGE SYSTEM TO BE MANAGED BY MULTIPLE MANAGERS

(75) Inventor: Yoichi Mizuno, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 96 days.

(21) Appl. No.: 10/938,786

(22) Filed: Sep. 13, 2004

(65) Prior Publication Data

US 2006/0031636 A1  Feb. 9, 2006

(30) Foreign Application Priority Data

Aug. 4, 2004  (JP) ............................. 2004-227414

(51) Int. Cl.
*G06F 12/00* (2006.01)

(52) U.S. Cl. ............................. 711/112; 711/152; 707/9

(58) Field of Classification Search ................ 711/111, 711/112, 114, 154, 152; 707/9; 709/223, 709/225

See application file for complete search history.

(56) References Cited

U.S. PATENT DOCUMENTS

| 6,108,748 | A  |   | 8/2000  | Ofek et al. |           |
| 6,654,830 | B1 | * | 11/2003 | Taylor et al. | .................. 710/74 |
| 6,907,498 | B1 |   | 6/2005  | Kitamura et al. |       |
| 6,912,627 | B1 | * | 6/2005  | Matsunami et al. | ........ 711/154 |
| 6,950,914 | B1 | * | 9/2005  | Iwami et al. | ................ 711/154 |
| 2001/0044879 | A1 | * | 11/2001 | Moulton et al. | ............ 711/114 |
| 2003/0101317 | A1 | * | 5/2003  | Mizuno et al. | ............. 711/114 |
| 2003/0172069 | A1 | * | 9/2003  | Uchiyama et al. | ............. 707/9 |
| 2003/0212854 | A1 | * | 11/2003 | Kitamura et al. | ........... 711/112 |
| 2003/0221063 | A1 | * | 11/2003 | Eguchi et al. | .............. 711/114 |
| 2004/0039875 | A1 | * | 2/2004  | Kuwata | ....................... 711/114 |

FOREIGN PATENT DOCUMENTS

JP    2003-330622    11/2003

* cited by examiner

*Primary Examiner*—Matthew Kim
*Assistant Examiner*—Ryan A. Dare
(74) *Attorney, Agent, or Firm*—Antonelli, Terry, Stout and Kraus, LLP.

(57) ABSTRACT

A manager is allowed to retrieve management information of a logical volume for which the manager has the management right. A storage system has multiple logical volumes managed by different managers and a controller controlling the multiple logical volumes. The storage system stores first identification information for identifying each of the multiple logical volumes, first management information of a logical volume mapped to the first identification information, and correspondence between the first identification information and manager identification information of a manager having a management right for a logical volume identified by the first identification information. In response to an instruction having manager identification information of a manager in accordance with an input from the manager managing one of the multiple logical volumes, the storage system outputs first management information of a logical volume identified by first identification information mapped to the received manager identification information.

14 Claims, 12 Drawing Sheets

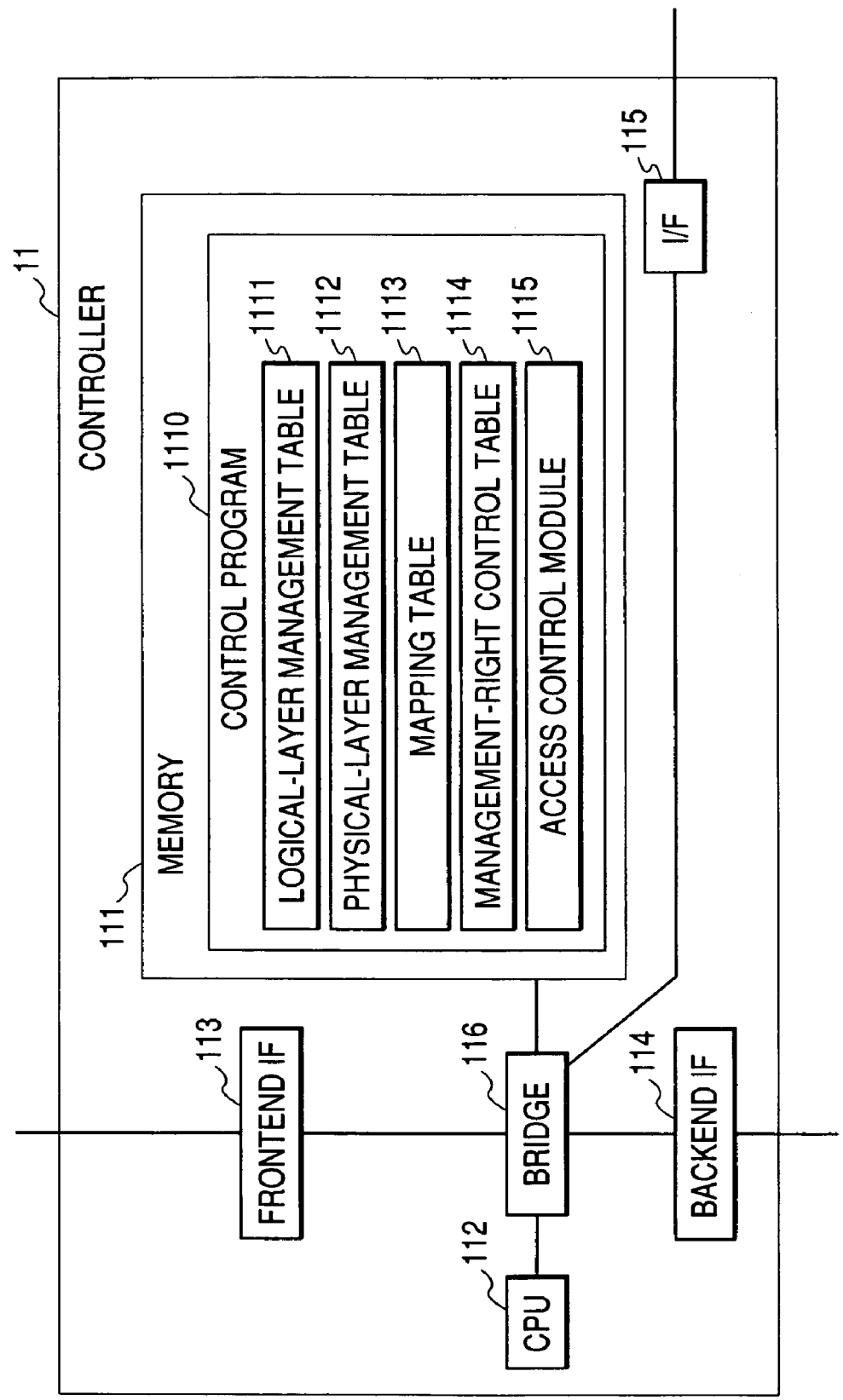

FIG. 3

| LOGICAL-OBJECT ID (1111a) | LOGICAL OBJECT (1111b) | MANAGEMENT INFORMATION (1111c) |
|---|---|---|
| 0123400010 | LU | HOST LUN0, 32 GB, PREFETCH: 512 KB, ... |
| 0123400020 | LU | HOST LUN1, 256 GB, PREFETCH: 64 KB, ... |
| 0123400030 | LU | HOST LUN0, 64 GB, WITHOUT PREFETCH, ... |
| ⋮ | ⋮ | ⋮ |

| PHYSICAL-OBJECT ID (1112a) | PHYSICAL OBJECT (1112b) | MANAGEMENT INFORMATION (1112c) |
|---|---|---|
| 0123411110 | INTERNAL LU | INTERNAL LUN0, 32 GB, RG0, HDD0, HDD1, ... |
| 0123411120 | INTERNAL LU | INTERNAL LUN1, 256 GB, RG1, HDD3, HDD4, ... |
| 0123411130 | INTERNAL LU | INTERNAL LUN2, 64 GB, RG1, HDD3, HDD4, ... |
| 0123411140 | INTERNAL LU | INTERNAL LUN3, 32 GB, RG1, HDD3, HDD4, ... |
| ⋮ | ⋮ | ⋮ |

MANAGEMENT SCREEN  ~4210

AdminA1 MANAGEMENT TABLE  ~4211

| LOGICAL-OBJECT ID | HOST LUN | Size | PREFETCH | Status | ··· |
|---|---|---|---|---|---|
| 0123400010 | LUN0 | 32GB | 512KB | WORM | ··· |

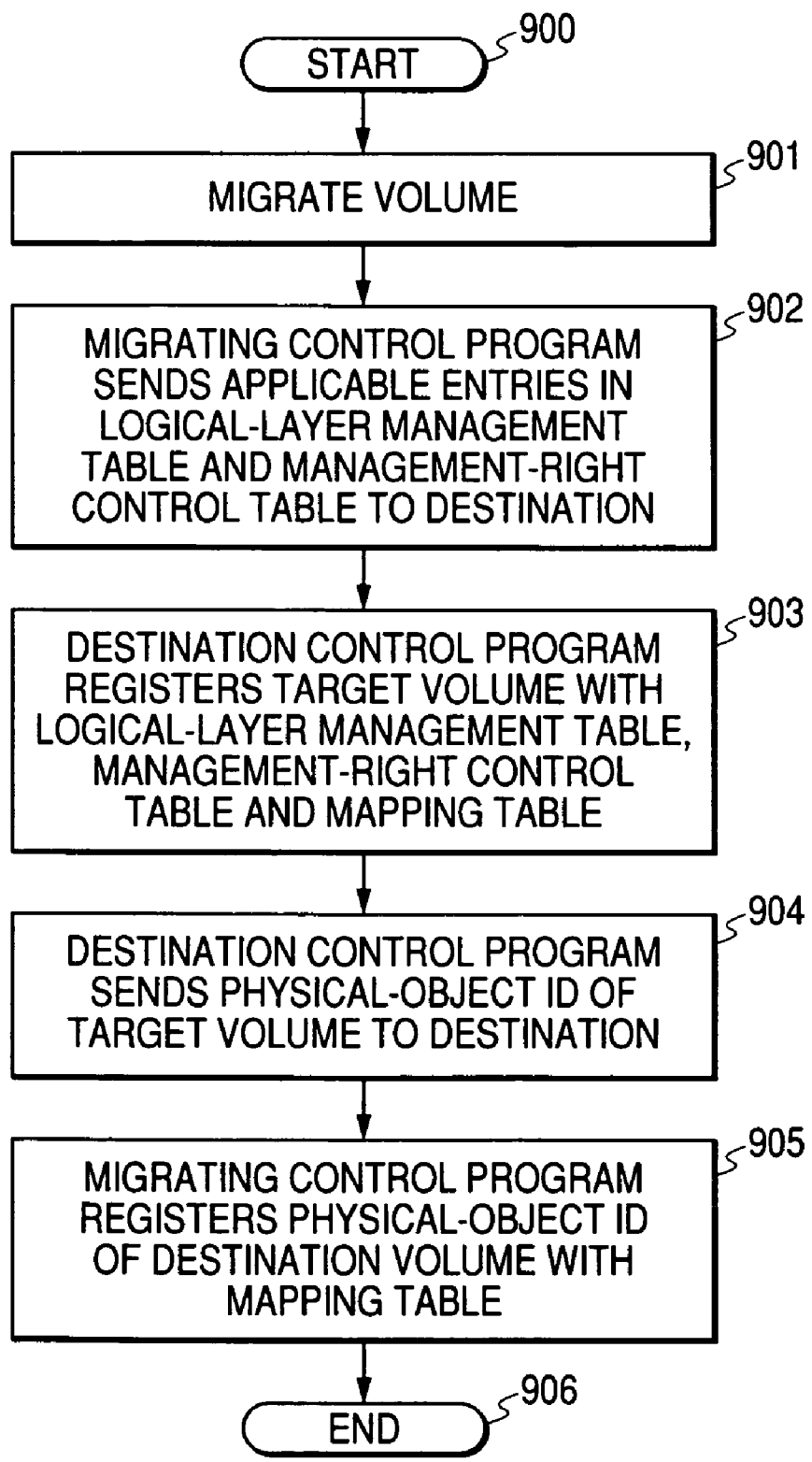

FIG. 12A

| LOGICAL-OBJECT ID | LOGICAL OBJECT | MANAGEMENT INFORMATION |
|---|---|---|
| 1000100010 | LU | HOST LUN1, 256 GB, PREFETCH: 64 KB, ... |
| 1000100020 | LU | HOST LUN0, 64 GB, WITHOUT PREFETCH, ... |
| ⋮ | ⋮ | ⋮ |

FIG. 12B

| LOGICAL-OBJECT ID | LOGICAL OBJECT | MANAGEMENT INFORMATION |
|---|---|---|
| 1000100010 | LU | HOST LUN1, 256 GB, PREFETCH: 64 KB, ... |
| 1000100020 | LU | HOST LUN0, 64 GB, WITHOUT PREFETCH, ... |
| 0123400010 | LU | HOST LUN0, 32 GB, PREFETCH: 512 KB, ... |
| ⋮ | ⋮ | ⋮ |

FIG. 13

| PHYSICAL-OBJECT ID | PHYSICAL OBJECT | MANAGEMENT INFORMATION |
|---|---|---|
| ⋮ | ⋮ | ⋮ |
| 1000111190 | INTERNAL LU | INTERNAL LUN8, 32 GB, RG3, HDD8, HDD9, ... |
| ⋮ | ⋮ | ⋮ |

FIG. 14A

| USER-GROUP ID | MANAGER ID | PASSWORD | LOGICAL-OBJECT ID |
|---|---|---|---|
| CompanyE | AdminE1 | **** | 1000100010 |
| CompanyF | AdminF1 | **** | 1000100020 |
| ⋮ | ⋮ | ⋮ | ⋮ |

| USER-GROUP ID | MANAGER ID | PASSWORD | LOGICAL-OBJECT ID |
|---|---|---|---|
| CompanyE | AdminE1 | **** | 1000100010 |
| CompanyF | AdminF1 | **** | 1000100020 |
| CompanyA | AdminA1 | **** | 0123400010 |
| ⋮ | ⋮ | ⋮ | ⋮ |

| LOGICAL-LAYER ID | PHYSICAL-LAYER ID |
|---|---|
| ⋮ | ⋮ |
| 0123400010 | 1000111190 |
| ⋮ | ⋮ |

FIG. 16

| LOGICAL-LAYER ID | PHYSICAL-LAYER ID |
|---|---|
| 0123400010 | 1000111190 |
| 0123400020 | 0123411120 |
| 0123400030 | 0123411130 |
| ⋮ | ⋮ |

…

METHOD OF MANAGING STORAGE SYSTEM TO BE MANAGED BY MULTIPLE MANAGERS

This application relates to and claims priority from Japanese Patent Application No. JP2004-227414, filed on Aug. 4, 2004, the entire disclosure of which is incorporated herein by reference.

BACKGROUND

The present invention relates to a storage system and a managing method therefor, and, in particular, to a managing method for use in sharing a storage system among multiple users.

With the increase in capacity of a storage system, multiple users have to share one storage system more frequently than before. For example, a storage area in a storage system may be divided into multiple sub-storage areas, which may be assigned to multiple sections in a company. Thus, the sections can use the sub-storage areas independently. Alternatively, sub-storage areas in a storage system may be assigned and lent to multiple companies by a Storage Service Provider (SSP).

In this case, a user must access only a sub-storage area (which will be called a logical unit (LU) or logical volume hereinafter) that is assigned to the user and avoid interference with other users. Furthermore, in order to prevent damage due to illegal access by a malicious user to an entire storage system, a certain level of security is required.

JP-A-2003-330622 discloses an example of a method used for dividing a storage system into multiple storage areas and assigning the resulting storage areas to users or host computers. According to JP-A-2003-330622, an access right to a logical volume is defined for each user by an access management server. Based on the access right, the authorization of accesses to the logical volume from users can be judged. Thus, access control for each user can be performed over every logical volume.

SUMMARY

While an access right to a logical volume can be defined for each user according to JP-2003-330622, management of logical volumes by users is not considered. In other words, when multiple users share one storage system, each user must have a management right for a logical volume assigned to the user, but must be prevented from acquiring management rights for logical volumes assigned to the other users. However, JP-A-2003-330622 does not consider this problem.

Therefore, a storage system has multiple logical volumes, which are managed by different managers, and a controller controlling the multiple logical volumes. The storage system stores first identification information for identifying each of the multiple logical volumes, first management information of a logical volume mapped to the first identification information, and correspondences between the first identification information and manager identification information of a manager having a management right for a logical volume identifiable by the first identification information. In response to the reception of an instruction having manager identification information of a manager in accordance with an input from the manager managing one of the multiple logical volumes, the storage system outputs first management information of a logical volume identifiable by first identification information mapped to the received manager identification information.

A manager of the storage system can retrieve management information of a logical volume for which the manager has the management right among multiple logical volumes in the storage system.

BRIEF DESCRIPTION OF THE DRAWINGS

FIG. 2 is a block diagram showing a configuration example of a controller of a storage system;

FIG. 3 is a diagram showing an example of a Logical-Layer management table;

FIG. 4 is a diagram showing an example of a Physical-Layer management table;

FIG. 9 is a diagram showing an example of a display screen of a management console;

FIG. 11 is a flowchart showing an example of management-right transfer processing at the time of data migration;

FIGS. 12A and 12B are diagrams showing examples of a Logical-Layer management table of a data destination storage system;

FIG. 13 is a diagram showing an example of a physical-layer management table of a data destination storage system;

FIGS. 14A and 14B are diagrams showing examples of a management-right control table of a destination storage system;

FIG. 15 is a diagram showing an example of a mapping table of a data destination storage system; and FIG. 16 is a diagram showing an example of a mapping table of a data destination storage system.

DESCRIPTION OF THE PREFERRED EMBODIMENT

An embodiment of the invention will be described below. It is not intended that the invention be limited by this embodiment.

Figure 1:
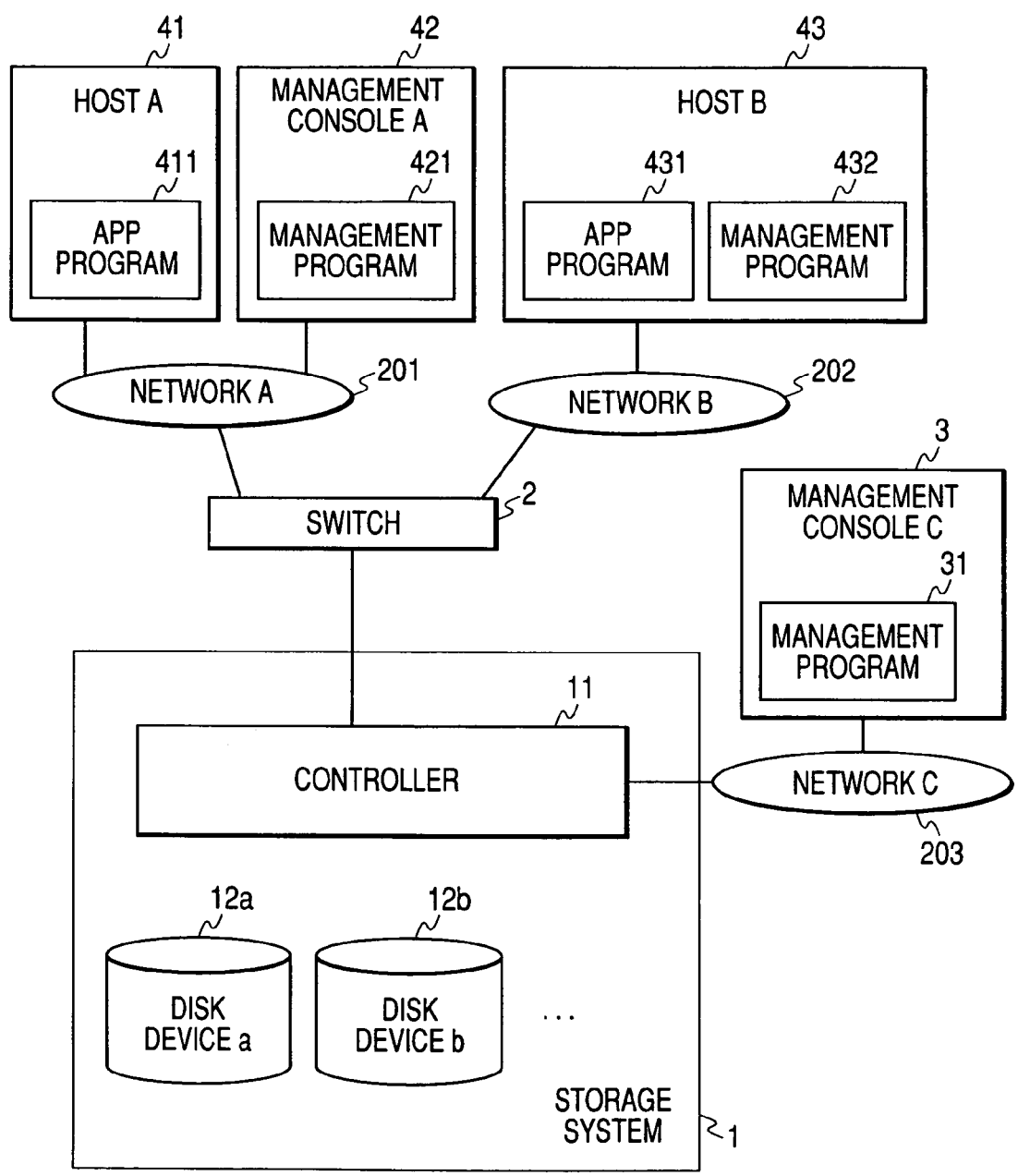
FIG. 1 is a block diagram showing a system configuration example according to one embodiment.

FIG. 1 is a diagram showing a system configuration example of this embodiment.

A computer system includes a storage system 1, a switch 2, a network A201, a network B202, a network C203, a management console C3, a host computer A41 (simply called a host hereinafter), a management console A42 and a host B43. The switch 2 connects one or multiple networks and the storage system 1. The network A201 is used by a user company A, which is a user of the storage system 1. The network B202 is used by a user company B, which is another user of the storage system 1. The network C203 is a network for managing the storage system 1. The management console C3 manages the storage system 1 over the network C203. The host A41 is used by the user company A. The management console A42 is used by a user manager of the user company A for managing a logical volume assigned to the user company A. The host B43 is used by the user company B.

The storage system 1 includes a controller 11 and one or multiple disk devices 12 (12a and 12b). The controller 11 controls the storage system 1. The disk devices 12 store data received from the hosts. The multiple disk devices 12 may be grouped into Redundant Arrays of Inexpensive Disks (RAID). Logical Units (LUs) are defined for the storage system 1. The LUs are logical storage areas including storage areas within the disk devices 12. The LUs may include storage areas within one disk device 12, or they may include storage areas within multiple disk devices 12.

The storage system 1 is prepared by a system provider providing a storage service, and one storage system is used by multiple users. For simple description, a computer system includes one storage system here. However, a computer system may have multiple storage systems.

According to this embodiment, the storage system 1 is used by the user company A and the user company B, for example. However, the number of users of the storage system 1 is not limited to the one shown in the example. Here, a manager of a user company using the storage system 1 is called a user manager, and a manager of a system provider providing the storage system 1 is called a system manager.

The management console C3 accesses the storage system 1 over the network C203. The management console C3 is a computer to be used by a system manager providing the storage system 1 for accessing the storage system 1 and managing the storage system 1. The network C203 may be a private network to be used by the management console C3 for accessing the storage system 1. Alternatively, the management console A42 and host B43 used by a user manager and the management console C3 all may be connected to the network C203, and the network C203 may be shared for managing the storage system 1 among these computers.

The management console C3 has a management program 31, which is stored in a memory of the management console C3 and is executable by a processor in the management console C3. The management console C3 uses the management program 31 to manage the storage system 1.

The host A41 has a memory and a processor. The memory stores an application 411, which is executable by the processor. In accordance with a request from the application 411, the host A41 accesses a logical volume in the storage system 1 assigned to the user company A over the network A201 and uses data stored in the logical volume.

The management console A42 also has a memory and a processor. The memory stores a management program 421, which is executable by the processor. A user manager of the user company A executes the management program 421 by using the management console A42 to manage a logical volume within the storage system 1, which is assigned to the user company A.

The host B43 to be used by the user company B also has a memory and a processor. The memory stores an application program 431 and management program 432 to be executed by the processor. The host B43 executes the management program 432 to manage a logical volume of the storage system 1, which is assigned to the user company B. Like the host A41, the host B43 accesses a logical volume assigned to the user company B through the network B202 in response to a request from the application program 431.

By operating a management program on a host in this way, the host can also function as a management console. Whether a host and a management console are provided separately or a host also functions as a management console can be selected based on a construction desired by a user.

As described above, management consoles to be used by user managers can be connected to the storage system 1 by Out-of-band (that is, through the network C203). In this case, the network A201 or the network B202 is used when a host of the user company A or user company B accesses data stored in a logical volume of the storage system 1. The network C203 is used when a user manager of the user company A or user company B manages a logical volume of the storage system 1.

FIG. 2 is a diagram showing a construction example of the controller 11 of the storage system 1.

The controller 11 includes a memory 111, a CPU 112, a Frontend interface (IF) 113, a Backend IF 114, an IF 115 and a bridge 116. The Frontend IF 113 receives access requests from hosts and management consoles through the switch 2. The Backend IF 114 is connected to the disk devices 12. The IF 115 is connected to the management console C3 and so on through the network C203.

The memory 111 stores a control program 1110 for controlling the storage system 1 and different kinds of information required for controlling the storage system 1, such as control information and management information. The memory 111 is also used as a cache for temporarily storing data from a host in order to increase the performance of disk access.

The control program 1110 includes a Logical-Layer management table 1111, a Physical-Layer management table 1112, a mapping table 1113, a management-right control table 1114 and an access control module 1115. The Logical-Layer management table 1111 describes logical management information managed by a user manager. The Physical-Layer management table 1112 describes physical management information depending on a physical construction and/or arrangement of storage areas within the storage system 1. The mapping table 1113 describes mapping of logical layer management information recorded in the Logical-Layer management table 1111 and physical layer management information recorded in the Physical-Layer management table 1112. The management-right control table 1114 describes management rights for different kinds of management information. The access control module 1115 controls an access right for a logical volume of each user.

The CPU 112 executes the control program 1110 to control the storage system 1.

The Frontend IF 113 controls inputs/outputs between hosts or management consoles and the controller 11. The Backend IF 114 controls inputs/outputs between the controller 11 and the disk device 12. A host and the controller 11 and the disk device 12 and the controller 11 may be connected through various IFs such as a Fiber Channel, a Small Computer System Interface (SCSI), an Internet Small Computer System Interface (iSCSI), an Infiniband, a Serial ATA (SATA), and a Serial Attached SCSI (SAS). The host side and disk device side of the controller 11 may be sometimes called Frontend and Backend, respectively.

While one port is provided for each of the Frontend IF 113 and Backend IF 114 for simple description, multiple ports may be provided. Multiple Frontend IFs 113 and Backend IFs 114 may be provided.

The IF 115 is an IF provided separately from the Frontend IF 113 and Backend IF 114 to be used for inputs/outputs of data to/from hosts and is used as a port for managing the storage system 1. The IF 115 and the management console C3 may be also connected through various IFs and are preferably connected through a LAN-compliant IF for popular network equipment.

The bridge 116 controls various kinds of data transfer such as data transfer between the CPU 112 and the memory 111 and data transfer between the Frontend IF 113 and the memory 111.

Notably, multiple controllers 11 may be provided within the storage system 1 for implementing load balancing and addressing failover.

FIG. 3 is a diagram showing an example of the Logical-Layer management table 1111 stored in the memory 111 of the controller 11 of the storage system 1.

A logical management object (called a logical object hereinafter) is described in the Logical-Layer management table 1111. The logical management object can be managed by a user manager. More specifically, in the Logical-Layer management table 1111, a logical-object ID 1111a, a logical object 1111b and management information 1111c are mapped. The logical object ID 1111a is used for identifying an object to be managed. The logical object 1111b indicates a type of an object to be managed. The management information 1111c indicates details to be managed by a logical object to be managed.

The logical-object ID 1111a is identification information by which a logical object can be identified globally uniquely and may be a logical-object ID having a unique ID in a storage system along with a unique serial number in a storage system, for example. The control program 1110 can create such a logical-object ID, for example.

A user manager uses the logical-object ID 1111a to access target management information. Here, while an LU defined in the storage system 1 is used as an example of the logical object 1111b, management rights may be further defined in smaller units when logical-object IDs are given to attributes of an LU. For example, logical-object IDs may be given separately to a parameter relating to performance tuning and a parameter relating to data storage so as to be managed by different managers and management programs.

The management information 1111c is management information relating to the logical object 1111b. When the logical object 1111b is an LU, for example, the management information 1111c corresponds to a host LUN, which is an identification number to be used by a host for identifying the LU, a storage capacity of the LU, and a prefetch policy (such as a prefetch capacity and the requirement of prefetch processing) for data to a cache memory with respect to the LU.

FIG. 4 is a diagram showing an example of the Physical-Layer management table 1112 stored in the memory 111 of the controller 11 of the storage system 1.

Physical management information depending on a physical construction and/or arrangement thereof in the storage system 1 is described in the Physical-Layer management table 1112. Like the Logical-Layer management table 1111, in the Physical-Layer management table 1112, a physical-object ID 1112a, a physical object 1112b and management information 1112c are mapped. Here, the physical-object ID 1112a is used for identifying a physical object to be managed. The physical object 1112b indicates a type of an object to be managed. The management information 1112c indicates details to be managed by a physical object to be managed.

The physical-object ID 1112a is created in the same manner as that for the logical-object ID 1111a registered within the Logical-Layer management table 1111.

Notably, while an internal LU is used as an example of the physical object 1112b managed in the Physical-Layer management table 1112 in FIG. 4, the physical object 1112b to be managed may be a physical object depending on a physical construction of a RAID group, the disk device 12 or the controller 11. Details of the internal LU will be described later.

The management information 1112c is management information relating to the physical object 1112b. When the physical object 1112b is an internal LU, for example, management information 1112c is registered including an internal LUN, which is identification information of the internal LU within the storage system 1, a storage capacity of the internal LU, an identification number of the RAID group in the internal LU, and an identification number of the disk device 12 in the internal LU.

Figure 5:
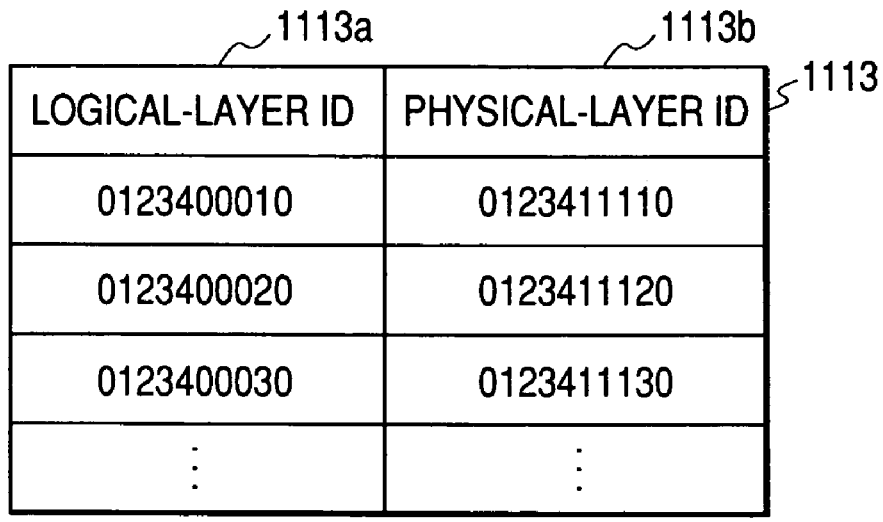
FIG. 5 is a diagram showing an example of a mapping table.

FIG. 5 is a diagram showing an example of the mapping table 1113 stored in the memory 111 of the controller 11 of the storage system 1.

The mapping table 1113 describes correspondences between logical objects registered with the Logical-Layer management table 1111 and physical objects compose the logical objects. In the mapping table 1113, a logical-layer ID 1113a and a physical-layer ID 1113b are mapped. The logical-layer ID 1113a refers to a logical-object ID of a logical object. The physical-layer ID 1113b refers to a physical-object ID of a physical object.

As shown in the mapping table in FIG. 5, taking an LU as an example, an LU (host LUN0) of a logical object referred to by a logical-object ID, 0123400010, is mapped to an internal LU (internal LUN0) of a physical object referred to by a physical-object ID, 0123411110. Similarly, an LU (host LUN1) of a logical object referred to by a logical-object ID, 0123400020, is mapped to an internal LU (internal LUN1) of a physical object referred to by a physical-object ID, 0123411120.

Notably, when a logical object and a physical object are managed in different unit sizes, multiple logical objects may be mapped to one and the same physical object. Conversely, multiple physical objects may be mapped to one logical object. The construction of the mapping table 1113 is not limited to the one shown in FIG. 5, as long as correspondences between logical objects and physical objects which compose (or corresponding to) the logical objects are clearly shown.

Figure 6:
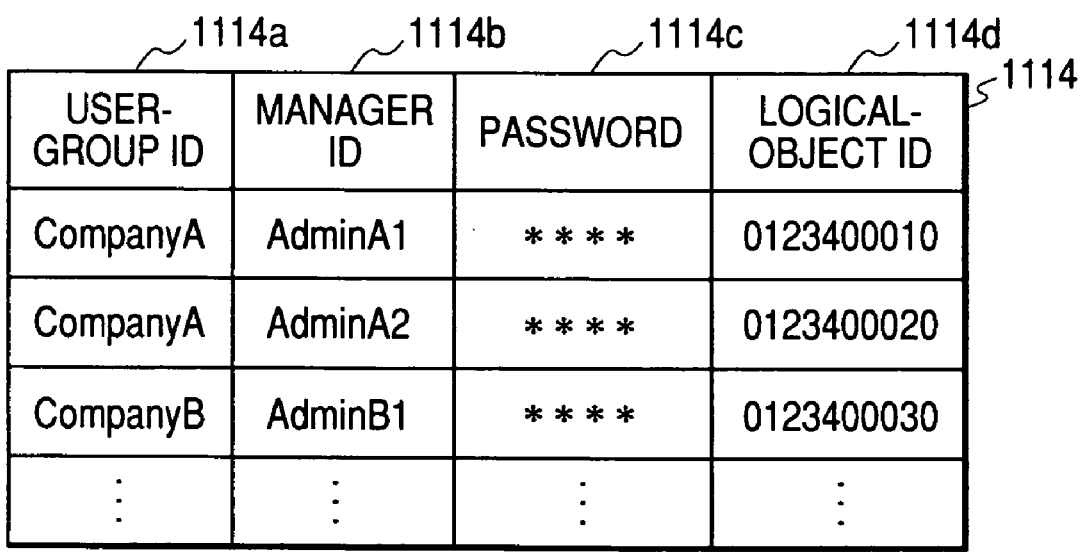
FIG. 6 is a diagram showing an example of a management-right control table.

FIG. 6 is a diagram showing an example of the management-right control table 1114 stored in the memory 111 of the controller 11 of the storage system 1.

In the management-right control table 1114, a user-group ID 1114a, a manager ID 1114b, a password 1114c and a logical-object ID 1114d are mapped. The user-group ID 1114a is used for identifying a user group. The manager ID 1114b is used for identifying a user manager within a user group. The password 1114c is used for authenticating a manager. The logical-object ID 1114d is used for identifying a logical object to be managed. The management-right control table 1114 shows which logical object can be managed by each manager. The control program 1110 can uniquely identify a user manager based on the user-group ID 1114a and the manager ID 1114b.

In the example shown in FIG. 6, a user-group ID "CompanyA" is assigned to the user company A, and a user-group ID, CompanyB, is assigned to the user company B. When an IP network is used by a user for accessing the storage system 1 from a host or a management console, a Virtual LAN (VLAN) may be defined for each user group to access the storage system 1 from the host or management console. In this case, a VLAN ID may be used as a user-group ID.

A user manager identified by a manager ID, AdminA1, of the user group ID, CompanyA, has a management right for a logical object identified by the logical-object ID, 0123400010. A user manager identified by a manager ID, AdminA2, of the same user group ID, CompanyA, has a management right for a logical object identified by the logical-object ID, 0123400020. In this way, multiple user managers may be included in one user group, and a management right of each user manager may be defined in the management-right control table 1114.

Notably, a management right to be assigned to a user manager is a management right for a logical object only, and a system manager has a management right for a physical object.

Next, a logical volume will be described. A storage area within the normal disk device 12 is recognized by a host in logical volumes (also called Logical Units (LUs)). Multiple logical volumes can be defined and constructed within the storage system 1. The logical volume is called an internal LU. In order to manage internal LUs, serial numbers are given to the internal LUs in the storage system 1. The serial numbers are integers from 0. The number is called an Internal LUN.

On the other hand, upon boot-up of an OS stored in a memory, a host thereof searches a storage system that the host is connecting to and detects an LU available in the storage system 1. Generally, a host assumes that LUNs given to LUs are serial numbers from 0 and searches sequentially from the LU with LUN0. When an LU identified by a certain LUN cannot be found, the search may be terminated, and further search may not be performed. This is for reducing the search time.

In this case, when the host uses an internal LUN to search an LU thereby, the host to which an LU without Internal LUN0 cannot be detected. Accordingly, an LUN must be re-defined for an LU assigned to each host such that all hosts can search through serial LUNs starting from 0. The re-defined LUN is called a host LUN. In this way, two LUNs including an internal LUN and a host LUN are assigned to each LU. Thus, a host LUN to be used by a host and an internal LUN to be used in the storage system 1, which are LUNs for identifying one and the same LU, are distinguished and may have different values.

Figure 7:
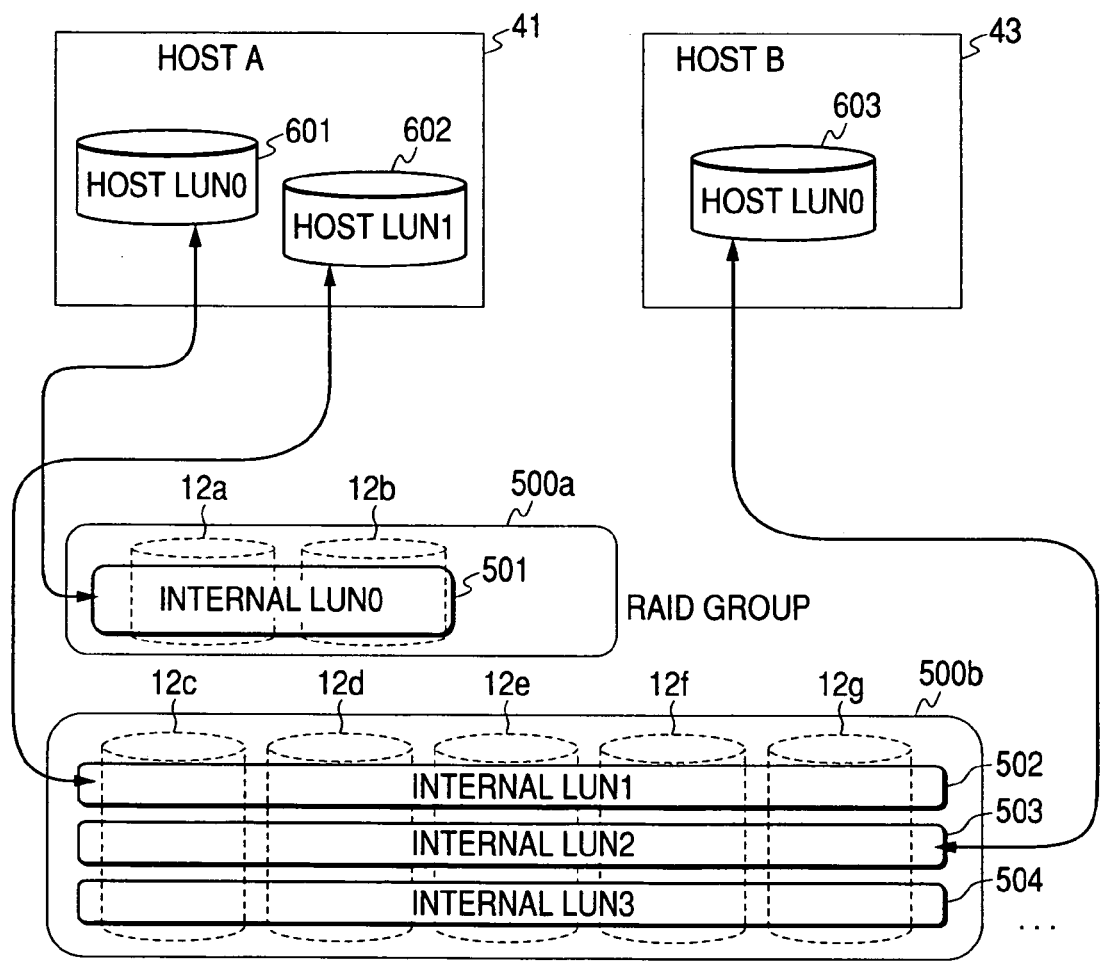
FIG. 7 is a diagram showing an example of the assignment of logical volumes to hosts.

FIG. 7 is a diagram schematically showing an example of the assignment of a logical volume to a host.

In the example shown in FIG. 7, RAID groups 500a and 500b include multiple disk devices 12a to 12g, and multiple internal LUs 501 to 504 (with Internal LUN0 to Internal LUN3) are defined for the RAID groups 500a and 500b. In the storage system 1, an Internal LUN is assigned to an internal LU. The Internal LUN is a unique ID for identifying and managing the internal LU. In the example shown in FIG. 7, one logical volume with Internal LUN0 exists in the RAID group 500a, and three logical volumes with Internal LUN1, Internal LUN2 and Internal LUN3 exist in the RAID group 500b.

On the other hand, logical volumes including an LU 601, an LU 602 and an LU 603 are provided which are recognized by hosts. The host A41 recognizes two logical volumes including a logical volume identifiable by an ID, Host LUN0, (of the host LU 601), and a logical volume identifiably by an ID, Host LUN1, (of the host LU 602). The host B43 recognizes a logical volume identifiable by an ID, Host LUN0, (of the host LU 603). The logical volume with Host LUN0 to be identified by the host A41 is mapped to the internal LU 501 with Internal LUN0. The logical volume with Host LUN1 to be identified by the host A41 is mapped to the internal LU 502 with Internal LUN1. The logical volume with Host LUN0 to be identified by the host B43 is mapped to the internal LU 503 with Internal LUN2.

The access control module 1115 controls which logical volume is assigned to which host. A logical volume can be assigned to each user. In this case, with reference to and based on a record of an assignment of a logical volume accessible by a user to a user list and in accordance with a logging-in user, the access control module 1115 changes a host LUN to be provided to the user.

Figure 8:
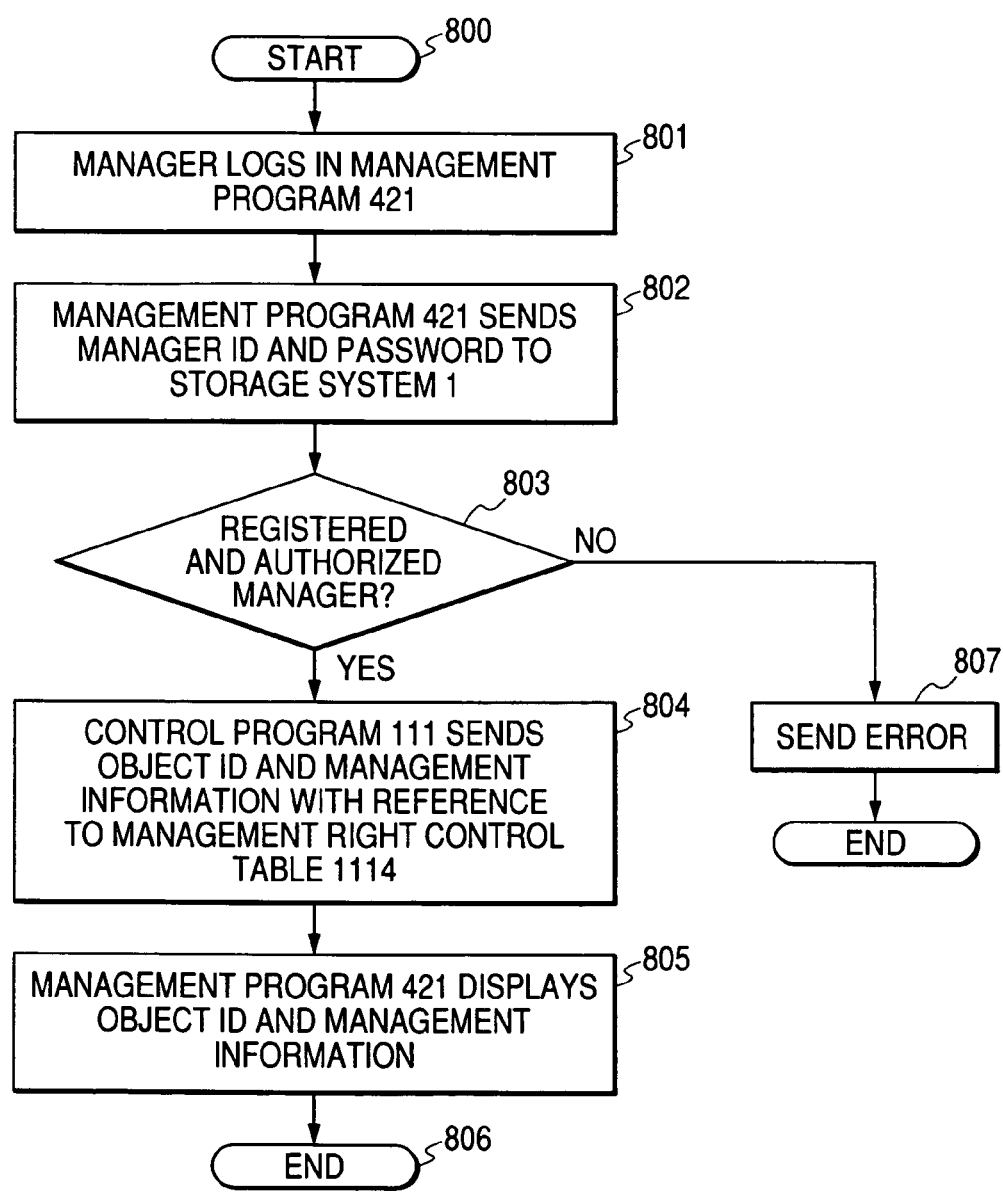
FIG. 8 is a flowchart diagram showing an example of processing for retrieving management information of a logical object.

Next, processing for retrieving management information of a logical object assigned to a user manager by using the management program 421 or 432 by the user manager will be described. FIG. 8 is a flowchart showing an example of the processing for retrieving management information of a logical object.

For example, the user manager with AdminA1 of the user company A retrieves management information by using the management program 421 to be operated on the management console A42. This example will be described below.

First of all, the user manager AdminA1 inputs a manager ID and password thereof to the management console A42 and logs in the management program 421 (step 801).

The management program 421 receives an input from the user manager AdminA1 and sends the manager ID, the password and a user group ID to the storage system 1. Here, it is assumed that the user group ID was registered with the management program 421 in advance. Since the control program 1110 of the storage system 1 may manage manager IDs that are uniquely identifiable, a manager ID, a password and a user group ID may be sent through the network A201 (Inband) or the network C203 (Out-of-band) (step 802).

The control program 1110 of the storage system 1 authenticates the user manager with reference to the management-right control table 1114 by using the manager ID, password and user group ID received from the management program 421 (step 803).

In order to communicate with the storage system 1 through an IP network, as described above, an ID of a VLAN assigned to each user company to be used for the communication may be used as a user group ID. In other words, in order to exchange a manager ID and a password Inband, an ID of a VLAN of the user company A defined on the network A201 may be used as a user-group ID of the user company A. In order to send a manager ID and a password Out-of-band, an ID of a VLAN of the user company A defined on the network C203 may be used as a user-group ID of the user company A. When an ID of a VLAN is used as a user-group ID, the management program 421 does not send the user-group ID to the storage system 1. When the control program 1110 receives a manager ID and a password from the management program 421, an ID of a VLAN used in the communication of the manager ID and password is used as a user-group ID.

As a result of the authentication processing at the step 803, when a combination of the manager ID and password received by the control program 1110 has not been registered with the management-right control table 1114, and the manager having sent the manager ID and password is not determined to be a regular manager, the control program 1110 sends an error to the management program 421, and the processing ends (step 807).

On the other hand, when the authentication of the manager ID results in success at the step 803, the control program 1110 sends a logical-object ID 1114d corresponding to the received manager ID and management information 1111c of a logical object corresponding to the logical object ID 1114d to the management program 421 with reference to the management-right control table 1114 and the Logical-Layer management table 1111 (step 804).

In response to the reception of the logical-object ID 1114*d* and management information 1111*c*, the management program 421 displays the received logical-object ID 1114*d* and the management information 1111*c* on a display screen of the management console A42 (step 805).

FIG. 9 shows an example of a management screen displayed on the display screen of the management console A42 at the step 805. FIG. 9 is an example of a management screen 4210 when the user manager with AdminA1 of the user company A logs in the management program 421.

The management screen 4210 displays an AdminA1 management table 4211 having a logical-object ID and management information of a logical object, which can be managed by the user manager with AdminA1. The user manager with AdminA1 can learn from the AdminA1 management table 4211 that a logical object assigned to the user manager with AdminA1 is Host LUN0 indicated by the ID, 0123400010, the storage capacity of the logical volume is 32 GB, and control for prefetching data of 512 KB into a cache can be performed on the logical volume. The user manager with AdminA1 can further learn, from the fact that the Status of the logical volume is WORM (referring to Write Once Read Many), that data stored in the logical volume cannot be overwritten and reading is only allowed.

The user manager with AdminA1 manages the logical volume based on the information obtained from the management screen 4210. For example, in order to change a prefetch parameter value of Host LUN0, the user manager with AdminA1 selects the logical-object ID, 0123400010, and inputs to the management program 421 an instruction for changing the prefetch parameter value. Then, the management program 421 adds the logical-object ID, 0123400010, selected by the user manager to the control command instructing the change of the prefetch parameter value and sends the control command to the storage system 1. Since, in response to the control command, the control program 1110 can identify the logical object having the prefetch parameter value to be changed from the logical object ID included in the control command, the prefetch parameter value of Host LUN0 registered with the Logical-Layer management table 1111 is changed to a value specified by the control command. Furthermore, with reference to the mapping table 1113, the control program 1110 identifies a physical-object ID 1113*b*, 0123411110, corresponding to the logical-object ID 1113*a*, 0123400010, specified by the control command with reference to the mapping table 1113. The control program 1110 identifies Internal LUN0, which is a physical object identifiable by the physical-object ID 1113*b*, 01234111110, with reference to the Physical-Layer management table 1112. Then, the control program 1110 executes prefetch processing relating to an internal LU identifiable by Internal LUN0 based on the changed prefetch parameter value.

Notably, a user manager may prepare management script in a memory within a management console thereof and may describe an ID (the logical object ID, 0123400010, in the example shown in FIG. 9) indicating that the user manager has the management right in the management script in advance.

Thus, when the user manager issues a control command by using the management program 421, the management program 421 can identify the logical object from the management script without selecting the logical object ID one after another subject to the control command. Therefore, operations on logical volumes can be automatically performed.

In this way, a user manager can retrieve management information relating to a logical object from the storage system 1 by using the management program 421. Furthermore, a manager can manage a logical object by issuing a control command specifying a logical-object ID by using the management program 421 based on the retrieved management information. In the storage system 1 in response to a control command, a logical-object ID specified by the management program 421 is converted to the corresponding physical-object ID with reference to the mapping table 1113 describing correspondences of logical objects and physical objects. Furthermore, a physical object specified by the physical-object ID is identified with reference to the Physical-Layer management table 1112, and control instructed by a control command is performed on the physical object.

Notably, the user manager with AdminA1 cannot obtain management information relating to other logical objects, which are not assigned to the user manager with AdminA1. This is because, at the step 804 in FIG. 8, a logical-object ID mapped to a given manager ID and management information of the logical object are only sent to the management program 421.

In the same manner that the user manager with AdminA1 of the user company A obtains management information of a logical object, the management right of which is assigned to the user manager is obtained by using the management console A42 and manages the logical object, for example, as described above with reference to FIGS. 8 and 9, a user manager of the user company B may also obtain management information of a logical object, the management right of which is assigned to the user manager by using the management program 432 on the host B43 and may manage the logical object.

When the internal physical construction of the storage system 1 is changed, an object to be managed by a user manager may be changed in accordance with the change, for example. The example will be described next. Here, it is assumed that data is migrated between the storage systems 1 as an example of the change in physical construction.

Figure 10:
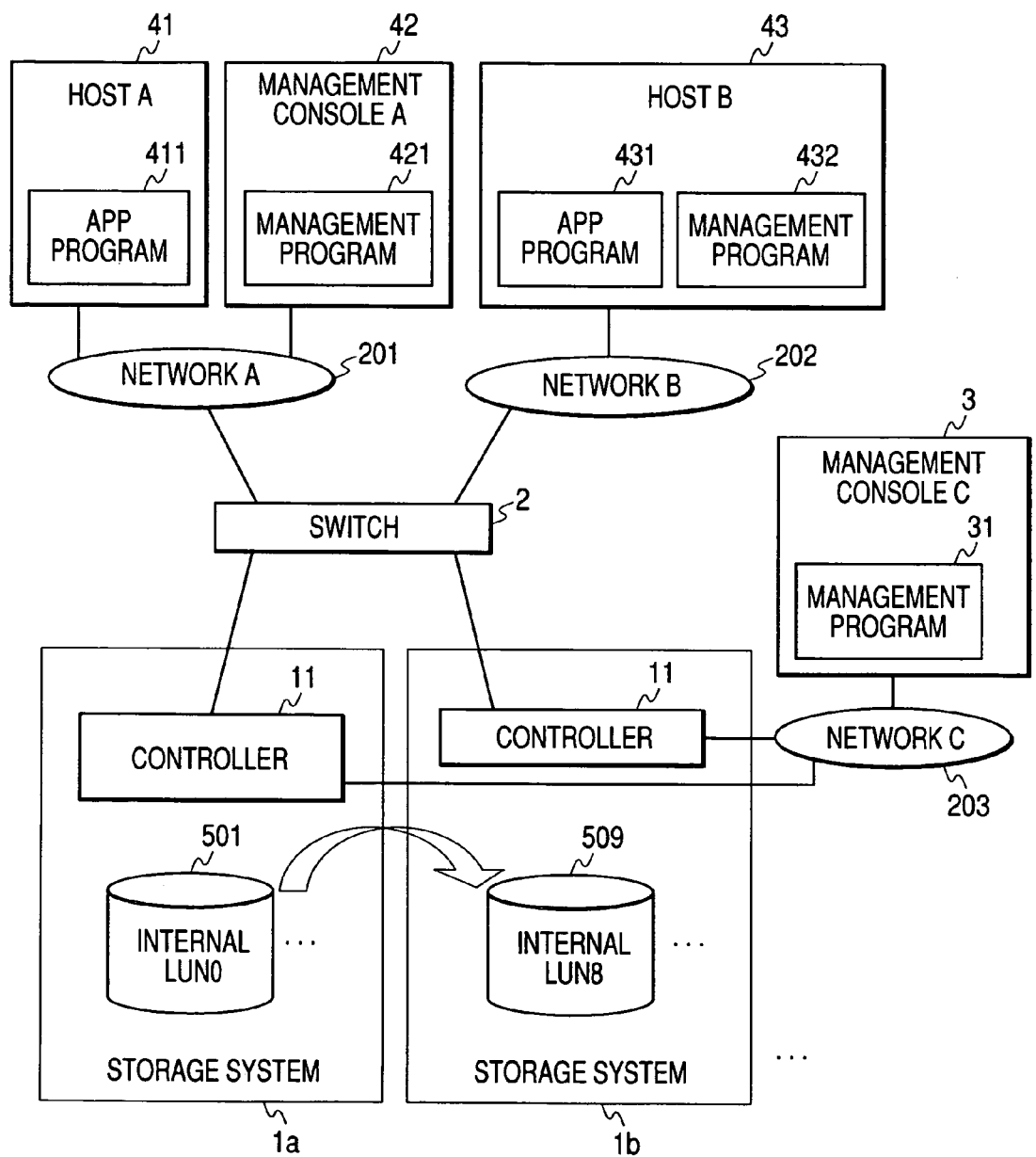
FIG. 10 is a block diagram showing an example of data migration between storage systems.

FIG. 10 is a diagram showing an example of data migration between the storage systems 1.

The systems shown in FIG. 10 and the systems shown in FIG. 1 are different in that the storage systems 1 in FIG. 10 are connected to a switch 2 and the host A41 and management console A42 of the user company A and the host B43 of the user company B can access the two storage systems. The construction of the storage system 1*a* and storage system 1*b* shown in FIG. 10 is the same as that of the storage system 1 shown in FIG. 1, and each of the storage systems 1*a* and 1*b* is connected to the management console C3 through the network C.

FIG. 10 shows a case where data of the user company A, which is stored in an internal LU 501 (Internal LUN0) within the storage system 1*a*, is migrated to an internal LU 509 (Internal LUN8) within the storage system 1*b*. In this case, a user manager of the user company A must newly obtain a management right for the destination internal LU 509 instead of the management right for the migrating internal LU 501.

FIG. 11 shows a flowchart illustrating an example of processing used for transferring a management right of a user manager in migrating data between the storage systems 1.

First of all, a system manager operates the management program 31 of the management console 3, selects the internal LU 501 (Internal LUN0) of the storage system 1*a*, which is the migrating volume, and the internal LU 509

(Internal LUN8) of the storage system 1b, which is the destination volume, and instructs to migrate data from the LU 501 (Internal LUN0) to the LU 509 (Internal LUN8). In accordance with the instruction, the migrating storage system 1a and the destination storage system 1b perform data migration from the LU 501 (Internal LUN0) to the LU 509 (Internal LUN8) (step 901). In order to allow access from the application program 411 of the host A41 used by a user of the user company A to the data being migrated even during the data migration, the storage system 1a and the storage system 1b copy the data to be migrated and switch the access paths. This kind of data migration processing is disclosed in U.S. Pat. No. 6,108,748, for example.

The data migration may be performed, not in response to an instruction from a system manager, but under the internal control of the storage systems 1. In both cases, the control program 1110 of the storage system 1a identifies and stores in advance a migrating logical volume within the storage system 1a, that is, a logical-object ID mapped to the logical volume and the physical-object ID with reference to the Physical-Layer management table 1112, mapping table 1113 and Logical-Layer management table 1111.

Next, the control program 1110 of the migrating storage system 1a identifies entries (row) having the logical-object ID corresponding to the migrating logical volume with reference to the Logical-Layer management table 1111 and management-right control table 1114. Then, the control program 1110 sends information recorded in the entries identified in the Logical-Layer management table 1111 and management-right control table 1114 to the destination storage system 1b (step 902).

Since a logical-object ID mapped to the migrating logical volume is stored as described above, the control program 1110 of the migrating storage system 1a can send information recorded in the Logical-Layer management table 1111 and management right control table 1114 relating to the logical-object ID to the destination storage system 1b.

In the example shown in FIG. 10, the migrating logical volume is in the internal LU 501 (Internal LUN0) of the storage system 1a. Referring to the Physical-Layer management table 1112 shown in FIG. 4, the physical-object ID of the internal LU 501 (Internal LUN0) is "0123411110". Referring to the mapping table 1113 shown in FIG. 5, the logical-object ID corresponding to the physical-object ID is "0123400010". Thus, the control program 1110 of the storage system 1a sends management information on the Logical-Layer management table 1111 relating to the logical-object ID, 0123400010, and information on the management-right control table 1114 relating to the logical-object ID, 0123400010, to the destination storage system 1b.

Notably, the entry of the Logical-Layer management table 1111 relating to a logical-object ID corresponding to a migrating logical volume may be stored in the memory 111 of the migrating storage system 1a even after information recorded in the entry is sent to the destination storage system 1b. Thus, in response to an inquiry about management information relating to the logical-object ID from the management program 421 to the migrating storage system 1a, the migrating storage system 1a can return management information corresponding to the logical-object ID to the management program 421. In this case, the information pieces registered with the Logical-Layer management tables must be synchronized between the storage system 1a and the storage system 1b, and same management information pieces must be stored for the same logical object between the two storage systems 1.

On the other hand, an entry of the Logical-Layer management table 1111 relating to the logical-object ID corresponding to the migrating logical volume may be deleted from the migrating storage system 1a after information recorded in the entry is sent to the destination storage system 1b. In this case, the management program 421 must inquire, of the control program 1110 of the destination storage system 1b, as to the management information relating to the logical-object ID after the step 902.

In response to the reception of the information relating to the migrating volume from the control program 1110 of the migrating storage system 1a, the control program 1110 of the destination storage system 1b rewrites the Logical-Layer management table 1111, the mapping table 1113 and the management-right control table 1114 based on the received information (step 903). The table rewriting processing (step 903) will be further described later.

Upon completion of the registration of the information relating to the migrating logical volume, the control program 1110 of the destination storage system 1b sends a notice of registration completion and a physical-object ID of the destination logical volume to the migrating storage system 1a (step 904).

The control program 1110 of the migrating storage system 1a registers the physical-object ID received from the destination storage system 1b with the mapping table 1113 in connection with the logical-object ID corresponding to the migrating logical volume (step 905). Then, the processing ends.

Next, the table rewriting processing in the storage system 1b, which is the destination of the data, will be described.

FIGS. 12A and 12B are diagrams showing examples of the Logical-Layer management table 1111 of the destination storage system 1b. FIG. 12A shows an example of the Logical-Layer management table 1111 of the storage system 1b before data is migrated thereto. FIG. 12B shows another example of the Logical-Layer management table 1111 of the storage system 1b after data is migrated thereto.

FIGS. 12A and 12B are different in that the Logical-Layer management table 1111 of the storage system 1b additionally includes the logical object with the logical-object ID, 0123400010, which has been managed by the storage system 1a before data migration. The control program 1110 of the destination storage system 1b which has received the information relating to the logical-object ID, 0123400010, at the step 902 in FIG. 11 performs addition processing at the step 903 in FIG. 11. When multiple logical objects relate to a migrating logical volume subject to data migration, entries for the multiple logical objects are added to the Logical-Layer management table 1111 of the destination storage system 1b.

FIG. 13 is a diagram showing an example of the Physical-Layer management table 1112 of the destination storage system 1b. The internal LU 509 (LUN8) of the storage system 1b, which is a destination logical volume, is managed under a physical-object ID, 1000111190. The entry relating to the physical-object ID, 1000111190, is added to the Physical-Layer management table 1112 when the internal LU 509 (LUN8) is created in the storage system 1b, which means that the Physical-Layer management table 1112 is not changed by the data migration.

FIGS. 14A and 14B are diagrams showing examples of the management-right control table 1114 of the destination storage system 1b. FIGS. 14A and 14B show the management-right control tables 1114 before and after data migration, respectively.

FIGS. 14A and 14B are different in that the management-right control table 1114 of the destination storage system 1b additionally includes, due to data migration, user manager information relating to the logical-object ID, 0123400010, having been managed by the storage system 1a before data migration. The control program 1110 of the destination storage system 1b having received the information relating to the logical-object ID, 0123400010, at the step 902 in FIG. 11 performs addition processing at the step 903 in FIG. 11. Notably, when multiple user managers are registered with a migrating logical volume or when multiple logical objects relate to a migrating logical volume and have user managers, respectively, multiple user manager IDs are added to the management-right control table 1114.

FIG. 15 is a diagram showing an example of a mapping table 1113 after data migration in the storage system 1b to which data is migrated. The data migration adds the logical-object ID, 0123400010, that is added to the Logical-Layer management table 1111 of the destination storage system 1b, also to the mapping table 1113. Furthermore, the physical-object ID, 1000111190 of the internal LU 509 (LUN8) of the storage system 1b, which is a destination logical volume, is registered as an ID of a physical object in the logical object ID, 0123400010. The control program 1110 of the destination storage system 1b having received the information relating to the logical-object ID, 0123400010, performs the addition processing at the step 903 in FIG. 11.

FIG. 16 is a diagram showing an example of the mapping table 1113 after data migration in the migrating storage system 1a. In comparison with the mapping table 1113 of the storage system 1a before data migration, as shown in FIG. 5, the data migration changes the physical object ID corresponding to the logical-object ID, 0123400010, to "1000111190". The physical-object ID, 1000111190, is a physical-object ID of the internal LU 509 (Internal LUN8) of the destination storage system 1b, which is a destination logical volume. The control program 1110 of the migrating storage system 1a receives the physical-object ID of the migrating volume at the step 904 in FIG. 11 and rewrites the mapping table 1113 at the step 905.

Thus, when data migration occurs between storage systems, a user manager having a management right for a migrating logical volume can obtain the management right for a destination logical volume instead of that for the migrating logical volume. Therefore, the management right can be transferred from the migrating logical volume to the destination logical volume.

In this way, unique logical and physical object IDs may be given to a logical volume to be used by a user in an entire computer system. Then, the logical-object ID may be used by a user manager to manage the logical volume, and a storage system or a system manager may manage the correspondence between the logical-object ID and the physical-object ID. Thus, even when data migration constructionally changes the logical object managed by a user, a user can manage the destination logical volume storing data of the user by using the same logical-object ID as the one before the data migration. Furthermore, irrespective of Inband or Out-of-band, a user manager can manage a logical volume storing data of the user by using a fixed unique logical-object ID even before and after data migration.

Furthermore, a system manager can flexibly change the physical construction of a storage system without effects on an existing management program of a user manager.

What is claimed is:

1. A storage system managed by multiple managers, the system comprising:

multiple logical volumes managed by different managers;

a controller controlling the multiple logical volumes;

a Logical-Layer management table, stored in the controller, mapping first identification information and first management information, said first identification information including a logical-object ID for identifying each of the multiple logical volumes, said first management information including a host LUN of a logical volume mapped to said first identification information, said logical-object ID having a unique ID along with a unique serial number, said host LUN being a re-defined LUN used by a host computer for identifying a logical volume;

a Physical-Layer management table, stored in the controller, mapping second identification information and second management information, said second identification information including a physical-object ID for identifying each of the multiple logical volumes, said second management information including an internal LUN mapped to said second identification information, said physical-object ID having a unique ID along with a unique serial number, said internal LUN being used in the storage system for identifying a logical volume;

a mapping table, stored in the controller, describing correspondence information between the first identification information recorded in the Logical-Layer management table and second identification information recorded in the Physical-Layer management table; and a management-right control table, stored in the controller, describing correspondence information between the first identification information recorded in the Logical-Layer management table and manager identification information including a user-group ID and manager ID of a manager having a management right for a logical volume identified by the first identification information, wherein, based on an instruction having manager identification information of a manager in accordance with an input from the manager managing one of the multiple logical volumes, the controller outputs, to a computer used by the manager, first identification information mapped to the manager identification information in the management-right control table and first management information of a logical volume identified by the first identification information in the Logical-Layer management table; and wherein the controller receives a control instruction having the first identification information in accordance with an input from the manager, identifies an internal LUN based on second identification information mapped to the received first identification information mapped to the received first identification information with reference to the Physical-Layer management table and the mapping table, and controls the logical volume identified by the identified internal LUN in accordance with the received control instruction.

2. A storage system according to claim 1, wherein, when the controller of the storage system receives a manager ID and a password from a computer used by a manager, identification information of a VLAN used in the communication of the manager ID and Password between the computer used by the manager and the storage system is used as the user-group ID of manager identification information, thereby to render the sending of the user-group ID from the manager unnecessary.

3. A storage system according to claim 1,
wherein management script describing first identification information of a logical unit to which the manager has a management right is prepared in the computer used by the manager in advance, and when a control instruction is inputted by the manager, the first identification information is identified from the management script and added to the control instruction in the computer used by the manager, thereby to render the input of first identification information by the manager unnecessary.

4. A storage system according to claim 1,
wherein first management information further includes a capacity of a logical volume identified by first identification information corresponding to the first management information, and
second management information further includes a capacity of a logical volume identified by second identification information corresponding to the second management information and identification information of a disk device in the logical volume.

5. A storage system according to claim 1,
wherein, when data stored in one of the multiple logical volumes is migrated to another logical volume in another storage system, the controller sends first identification information for identifying the migrating logical volume, first management information mapped to the first identification information and manager identification information mapped to the first identification information to the destination storage system.

6. A storage system according to claim 5,
wherein the controller retrieves second identification information of the logical volume to which data is being migrated from the destination storage system and stores first identification information of the migrating logical volume and second identification information of the destination logical volume in association.

7. A method for managing a storage system managed by multiple managers;
in which the storage system includes multiple logical volumes managed by different managers;
a controller controlling the multiple logical volumes;
a Logical-Layer management table, stored in the controller, mapping first identification information and first management information, said first identification information including a logical-object ID for identifying each of the multiple logical volumes, said first management information including a host LUN of a logical volume mapped to said first identification information, said logical-object ID having a unique ID along with a unique serial number, said host LUN being a re-defined LUN used by a host computer for identifying a logical volume;
a Physical-Layer management table, stored in the controller, mapping second identification information and second management information, said second identification information including a physical-object ID for identifying each of the multiple logical volumes, said second management information including an internal LUN mapped to the second identification information, said physical-object ID having a unique ID along with a unique serial number, said internal LUN being used in the storage system for identifying a logical volume;
a mapping table, stored in the controller, describing correspondence information between the first identification information recorded in the Logical-Layer management table and second identification information recorded in the Physical-Layer management table; and
a management-right control table, stored in the controller, describing correspondence information between the first identification information recorded in the Logical-Layer management table and manager identification information including a user-group ID and manager ID of a manager having a management right for a logical volume identified by the first identification information,
the method comprising the steps of:
based on an input from a manager managing one of the multiple logical volumes, sending an instruction having manager identification information of the manager to the storage system;
outputting first identification information mapped to the manager identification information in the management-right control table and first management information of a logical volume identified by the first identification information in the Logical-Layer management table from the storage system to the computer used by the manage;
receiving a control instruction having the first identification information in accordance with an input from the manager by the storage system;
identifying an internal LUN based on second identification information mapped to the received first identification information with reference to the Physical-Layer management table and the mapping table; and
controlling the logical volume identified by the identified internal LUN in accordance with the received control instruction.

8. A method according to claim 7,
wherein, when the controller of the storage system receives a manager Id and a password from a computer used by a manager, identification information of a VLAN used in the communication of the manager ID and Password between the computer used by the manager and the storage system to the storage system is used as the user-group ID of manager identification information, thereby to render the sending of the user-group ID from the manager unnecessary.

9. A method according to claim 7, further comprising the steps of:
preparing management script describing first identification information of a logical unit to which the manager has a management right in the computer used by the manager in advance; and
upon input of a control instruction by the manager, identifying the first identification information from the management script and adding the identified first identification information to the control instruction in the computer used by the manager, thereby to render the input of first identification information by the manager unnecessary.

10. A method according to claim 7,
wherein first management information further includes a capacity of a logical volume identified by first identification information corresponding to the first management information, and
second management information includes a capacity of a logical volume identified by second identification information corresponding to the second management information and identification information of a disk device in the logical volume.

11. A method according to claim 7, further comprising the steps of:
   migrating data stored in one of the multiple logical volumes to another logical volume in another storage system; and
   sending first identification information for identifying the migrating logical volume and first management information mapped to the first identification information to the destination storage system.

12. A method according to claim 11, further comprising the steps of:
   retrieving second identification information of the logical volume to which data is being migrated from the destination storage system; and
   storing first identification information of the migrating logical volume and second identification information of the destination logical volume in association.

13. A method according to claim 11, further comprising the step of:
   mapping and storing first identification information for identifying the migrating logical volume and second identification information for identifying the destination logical volume by the destination storage system.

14. A method according to claim 11, further comprising the steps of:
   sending first identification information for identifying the migrating logical volume and manager identification information mapped to the first identification information to the destination storage system; and
   mapping and storing the received first identification information and manager identification information by the destination storage system.

* * * * *